(12) United States Patent
Mraz et al.

(10) Patent No.: US 8,898,227 B1
(45) Date of Patent: Nov. 25, 2014

(54) NFS STORAGE VIA MULTIPLE ONE-WAY DATA LINKS

(71) Applicant: OWL Computing Technologies, Inc., Ridgefield, CT (US)

(72) Inventors: Ronald Mraz, South Salem, NY (US); Kenneth Lerman, Newtown, CT (US); Gabriel Silberman, Hastings on Hudson, NY (US)

(73) Assignee: OWL Computing Technologies, Inc., Ridgefield, CT (US)

( * ) Notice: Subject to any disclaimer, the term of this patent is extended or adjusted under 35 U.S.C. 154(b) by 89 days.

(21) Appl. No.: 13/892,099

(22) Filed: May 10, 2013

(51) Int. Cl.
*G06F 15/16* (2006.01)
*H04L 29/06* (2006.01)

(52) U.S. Cl.
CPC ..................................... *H04L 67/42* (2013.01)
USPC .......................................................... 709/203

(58) Field of Classification Search
USPC .......................................................... 709/203
See application file for complete search history.

(56) References Cited

U.S. PATENT DOCUMENTS

| | | | |
|---|---|---|---|
| 5,703,562 A | 12/1997 | Nilsen | |
| 7,103,638 B1 | 9/2006 | Borthakur et al. | |
| 7,693,892 B2 | 4/2010 | Koarashi | |
| 7,992,209 B1 * | 8/2011 | Menoher et al. | 726/26 |
| 8,068,415 B2 | 11/2011 | Mraz | |
| 8,095,628 B2 | 1/2012 | Bello et al. | |
| 8,139,581 B1 | 3/2012 | Mraz et al. | |
| 8,171,067 B2 | 5/2012 | Brown et al. | |
| 8,266,689 B2 | 9/2012 | Menoher et al. | |
| 8,353,022 B1 | 1/2013 | Menoher et al. | |
| 2004/0056666 A1 * | 3/2004 | Gohel | 324/539 |
| 2013/0097283 A1 | 4/2013 | Menoher et al. | |

OTHER PUBLICATIONS

RFC 1094—NFS—Network File System Protocol Specification—Mar. 1989.
RFC 1813—NFS Version 3 Protocol Specification—Jun. 1995.
RFC 3530—Network File System (NFS) version 4 Protocol—Apr. 2003.

* cited by examiner

*Primary Examiner* — Vivek Srivastava
*Assistant Examiner* — Nicholas Celani
(74) *Attorney, Agent, or Firm* — John S. Economou

(57) ABSTRACT

A system for bilaterally transferring information between a client and an NFS server. The client is coupled with an NFS server proxy running on a second receive server via a first network and communicates thereon. The processed first information is passed to a first send server via a dedicated network connection. The first send server causes the first information to be transmitted to the NFS server, via a first one-way data link, a first receive server, a second dedicated network connection and an NFS client proxy running on a second send server. The NFS server is coupled to the NFS client proxy via a second network. The NFS client proxy forwards information received from the NFS server to the client via a second one-way link, the NFS server proxy running on the second receive server and the first network.

35 Claims, 5 Drawing Sheets

NFS STORAGE VIA MULTIPLE ONE-WAY DATA LINKS

FIELD OF INVENTION

The present invention relates generally to a Network File System (NFS) storage device accessible via unidirectional data transfer.

BACKGROUND OF THE INVENTION

Protection of a computer or data network from undesired and unauthorized data disclosure, interception or alteration has been a perennial concern in the field of computer and network security. For example, firewall and anti-malware software have been developed to address security concerns for computers and networks connected to the Internet and to protect them from possible cyberattacks such as Trojan horse-type viruses or worms that may trigger undesired and unauthorized data disclosure by these computers and networks. However, for high security computer networks such as those used by government agencies and intelligence communities and certain commercial applications, conventional network security devices such as firewalls may not provide sufficiently reliable protection from undesired data disclosure.

Alternative network security methods and devices based on unidirectional data transfer have been devised to address the network security concern. For example, U.S. Pat. No. 5,703,562 to Nilsen ("the '562 Patent"), the content of which is hereby incorporated by reference in its entirety, provides an alternative way to address the network security concern. The '562 Patent discloses a method of transferring data from an unsecured computer to a secured computer over a one-way optical data link comprising an optical transmitter on the sending side and an optical receiver on the receiving side. By providing such an inherently unidirectional data link to a computer/data network to be protected, one can eliminate any possibility of unintended data leakage out of the computer/data network over the same link.

One-way data transfer systems based on such one-way data links provide network security to data networks by isolating the networks from potential security breaches (i.e., undesired and unauthorized data flow out of the secure network) while still allowing them to import data from the external source in a controlled fashion. FIG. 1 schematically illustrates an example of one such one-way data transfer system 100. In the one-way data transfer system shown in FIG. 1, two computing platforms (or nodes) 101 and 102 (respectively, "the Send Node" and "the Receive Node") are connected to the unsecured external network 104 ("the source network") and the secure network 105 ("the destination network"), respectively. The Send Node 101 is connected to the Receive Node 102 by a one-way data link 103, which may be an optical link comprising, for example, a high-bandwidth optical fiber. This one-way optical data link 103 may be configured to operate as a unidirectional data gateway from the source network 104 to the secure destination network 105 by having its ends connected to an optical transmitter on the Send Node and to an optical receiver on the Receive Node.

This configuration physically enforces one-way data transfer at both ends of the optical fiber connecting the Send Node 101 to the Receive Node 102, thereby creating a truly unidirectional one-way data link between the source network 104 and the destination network 105 shown in FIG. 1. Unlike the conventional firewalls, one-way data transfer systems based on a one-way data link are designed to transfer data or information only in one direction and it is physically impossible to transfer data or information of any kind in the reverse direction using that link. No information or data of any kind, including handshaking protocols such as those used in data transport protocols such as TCP/IP, SCSI, USB, Serial/Parallel Ports, etc., can travel in the reverse direction from the Receive Node back to the Send Node across the one-way data link. Such physically imposed unidirectionality in data flow cannot be hacked by a programmer, as is often done with firewalls. Accordingly, the one-way data transfer system based on a one-way data link ensures that data residing on the isolated secure computer or network is maximally protected from any undesired and unauthorized disclosure.

When two different network security domains need to communicate bilaterally, it is often desirable and necessary to apply different security policies or protocols to data flows in different directions. Preferably, data transfers from a low security domain to a high security domain are subject to fewer security restrictions, while a high security domain has a need to protect its data from the low security domain by carefully configured security protocols. For example, U.S. Pat. No. 7,992,209 to Menoher, et al., ("the '209 Patent"), the content of which is hereby incorporated by reference in its entirety, discloses a system for bilateral communication using two one-way data links Referring to FIG. 2, the system 201 in the '209 Patent comprises two computing platforms or nodes, Node A 202 and Node B 203, interconnected by two separate, oppositely directed one-way communication channels, Link R 204 and Link L 205. These one-way communication channels are deployed in parallel to enable bilateral communications between Node A and Node B, wherein Link R 204 is for unidirectional data transfer from Node A to Node B, while Link L 205 is for unidirectional data transfer in the opposite direction, from Node B to Node A. This arrangement forces all data traffic between Nodes A and B to flow unidirectionally through two entirely separate conduits, with each of the unidirectional data transfers across these conduits separately administered. The two links are separately administered by employing separate data transfer applications, interfaces and configuration files solely for the unidirectional data transfer in each direction, each set configured to prevent any crosstalk with the one-way communication channel for the opposite direction. In particular, in FIG. 2, Link R 204 is associated with data sending application 210 and interface 206 in Node A 202 and data receiving application 212 and interface 208 in Node B 203, while Link L 205 is associated with data sending application 213 and interface 209 in Node B 203 and data receiving application 211 and interface 207 in Node A 202. The one-way data links used in Link R 204 and Link L 205 in FIG. 2 may be of any type of data transfer conduit that is capable of enforcing unidirectional data flow. Examples of one-way data links and the corresponding network interface circuitry for enforcing unidirectional data flow through the links are disclosed in U.S. Pat. No. 8,068,415 to Mraz ("the '415 Patent"), the content of which is incorporated herein by reference in its entirety.

In FIG. 2, the data sending application 210 in Node A (or 213 in Node B) and data receiving application 212 in Node B (or 211 in Node A) in combination with proxy and session managing applications 220, 218 and 221, 219 respectively in Node A and Node B use Transmission Control Protocol/Internet Protocol (TCP/IP) as a user interface to the one-way data link in Link R 204 (or Link L 205). Examples of TCP-based one-way data transfer system are disclosed in U.S. Pat. No. 8,139,581 to Mraz et al. ("the '581 Patent"), the content of which is incorporated herein by reference in its entirety. The TCP proxy applications 220 and 221 are preferably TCP/IP socket-based proxy software, but may also be hardware-based or based on a suitable combination of software and hardware. The TCP proxy application 220 residing in Node A 202 fully implements TCP/IP-based bilateral communications between Node A and an external platform communicatively coupled to Node A, such as a remote terminal client 222 shown in FIG. 2. Likewise, the TCP proxy application 221 residing in Node B 203 fully implements TCP/IP-based bilateral communications between Node B and an external platform communicatively coupled to Node B, such as a remote terminal server 223 shown in FIG. 2.

The TCP session managing applications 218 and 219 are software-based applications for maintaining one or more TCP sessions. The session managing application 218, 219 in each node 202, 203 "splits" the bilateral communication channel between the node and corresponding remote terminal 222, 223 into two unidirectional communication channels based by strictly enforcing a separation of data coming from the remote terminal client 222, 223 and data coming via the data receiving application 211, 212.

The system shown in FIG. 2 simulates the TCP/IP protocol between the remote terminal client 222 and the remote terminal server 223 across the one-way data link in Link R 204 by replacing the IP information in the received data with pre-assigned channel numbers, so that no IP information is sent across the one-way data link. IP routes are pre-defined in the form of complementary channel mapping tables associated respectively with the data sending application 210 in Node A and data receiving application 212 in Node B. The data receiving application 212 then replaces the channel numbers in the received data with IP information from the channel mapping table and forwards the modified data to the TCP session managing application 219. The session managing application 219 maintains one or more TCP sessions and routes the received data packets or files from the data receiving application 212 to the proxy application 221. The TCP proxy application 221 in Node B fully implements the TCP/IP protocol in its bilateral communications with the remote terminal server 223, requests a socket connection and delivers the data received from the remote terminal client 222 to the remote terminal server 223. The same process is used to transfer data from remote terminal server 223 to remote terminal client 222, as discussed in further detail in the '209 Patent, but using data sending and receiving applications, interfaces and configuration files that are entirely separate from those associated with the one-way data transfer from remote terminal client 222 to remote terminal server 223.

The system shown in FIG. 2 and described above can support the inherently different security checks and restrictions required for transferring data from a lower security domain to a higher security domain and for transferring data from it (e.g., the situation where the client requesting data is in a lower security domain). In addition, that system can also support the inherently different security checks and restrictions required for transferring data from a higher security domain to a lower security domain and for transferring data from it (e.g., the situation where the client requesting data is in a higher security domain). However, the types of transfers allowed require some a priori knowledge of the information being requested. In addition, the data being transferred from the client to the server is completely independent from the data being transferred from the server to the client and the data is transmitted in a raw byte stream without any indication of message boundaries. This makes it difficult to filter data, for example based on message type.

The Network File System (NFS) is a standard network client/server protocol used to allow computers to mount a remote disk partition and transparently access it as if it were a local disk. In operation, an NFS client on a user computer communicates with a remote server where the remote disk is located using Remote Procedure Call (RPC) protocol in order to implement an access to files located on the remote disk. An RPC is an inter-process communication that allows a client to cause a subroutine or procedure to execute in another address space (e.g., on a known remote server) without the programmer explicitly coding the details for this remote interaction. An RPC is initiated by the client, which sends a request message to the known remote server to execute a specified procedure with supplied parameters. The remote server sends a response to the client, and the application continues its process. NFS operates based on matched RPC requests/replies, thus an implementation of NFS across the bilateral communication system of FIG. 2 would provide less than optimal results, for example due to a difficulty in filtering the raw message stream.

Hence, it is an object of the present invention to overcome the problems with the prior art and to provide an NFS implementation over a bilateral data transfer system comprising two or more one-way data links.

SUMMARY OF THE INVENTION

It has now been found that the above and related objects of the present invention are obtained in the form of several related aspects, including a secure system for bilaterally transferring information between a client coupled to a first network and a server coupled to a second network. The system includes a first platform including first send server, a first one-way data link and a first receive server, and a second platform including a second send server, a second one-way data link and a second receive server.

The first send server has a data communications interface. The first one-way data link has an input and an output. The first receive server has a data communications interface. The first send server is coupled to the input of the first one-way data link. The first receive server is coupled to the output of the first one-way data link. The first send server is configured to forward information received at the data communications interface to the input of the first one-way data link. The first receive server is configured to forward information received from the output of the first one-way data link to the data communications interface The second send server has a network connection and a data communications interface. The second one-way data link has an input and an output. The second receive server has a network connection and a data communications interface. The second send server is coupled to the input of the second one-way data link. The second receive server is coupled to the output of the second one-way data link. The network connection of the second receive server is coupled to the first network and the data communications interface is coupled only to the data communications interface of the first send server. The second send server is coupled to the second network via the network connection and the data communications interface is coupled only to the data communications interface of the first receive server.

The second receive server is configured to receive first information from the client via the first network and the network connection, to process the received first information and to forward the processed first information to the first send server via the data communications interface. Alternatively, the second receive server may forward the first information without processing. The second send server is configured to receive the processed first information via the data communications interface and to forward the processed first information to the server via the network connection and second network. The second send server is also configured to receive second information from the server via the second network and the network connection and to forward the second information to the second receive server via the second one-way data link. Alternatively, the second send server may process the second information before forwarding. The second receive server is also configured to receive the second information from the second one-way data link and to forward the second information to the client via the network connection and first network. The second receive server and the second send server are each also configured to maintain the first information completely separate from the second information.

In a further embodiment, the processing performed on the first information by the second receive server comprises filtering the information to remove a predetermined category of information. Further, the predetermined category of information may be identification information. Still further, the identification information may be user credentials.

In an embodiment, the first information is an NFS function call of a set of possible NFS function calls and the processing performed by the second receive server identifies a type of the NFS function call and blocks further transmission of the NFS function call if the identified type does not correspond to any one of a predetermined subset of possible NFS function calls. The predetermined subset of possible NFS function calls may be any NFS commands except for NFS write commands or NFS commands having write permission.

In a preferred embodiment, the second receive server is configured to operate as an NFS server proxy and the second send server is configured to operate as an NFS client proxy.

In a further embodiment, the second send server is further configured to filter the second information prior to forwarding the information to the second receive server via the second one-way data link.

In an alternative embodiment, the present invention is a system for bilaterally transferring information between a client coupled to a first network and a server coupled to a second network. The system includes a first platform having a first send server, a first one-way data link and a first receive server and a second platform having a second send server, a second one-way data link and a second receive server.

The first send server has a data communications interface. The first one-way data link has an input and an output. The first receive server has a network connection and a data communications interface. The first send server is coupled to the input of the first one-way data link and the first receive server is coupled to the output of the first one-way data link. The first send server is configured to forward information received at the data communications interface to the input of the first one-way data link. The network connection of the first receive server is coupled to the second network.

The second send server has a data communications interface coupled only to the data communications interface of the first receive server. The second one-way data link has an input and an output. The second receive server has a network connection and a data communications interface. The second send server is coupled to the input of the second one-way data link and the second receive server is coupled to the output of the second one-way data link. The network connection of the second receive server is coupled to the first network and the data communications interface of the second receive server is coupled only to the data communications interface of the first send server.

The second receive server is configured to receive first information from the client via the first network and network connection, to process the received first information and to forward the processed first information to the first send server via the data communications interface. Alternatively, the second receive server may forward the first information without processing. The first receive server is configured to receive the processed first information via the first one-way data link and to forward the processed first information to the server via the network connection and second network. The first receive server is also configured to receive second information from the server via the second network and the network connection and to forward the second information to the second send server via the data communications interface. Alternatively, the first receive server may process the second information before forwarding. The second receive server is also configured to receive the second information from the second one-way data link and to forward the second information to the client via the network connection and first network. The second receive server and the first receive server are each also configured to maintain the first information completely separate from the second information. In a further alternative embodiment, a first client/server replaces the client coupled to the first network and a second client/server replaces the server coupled to the second network.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein.

DETAILED DESCRIPTION OF PREFERRED EMBODIMENTS

Figure 3:
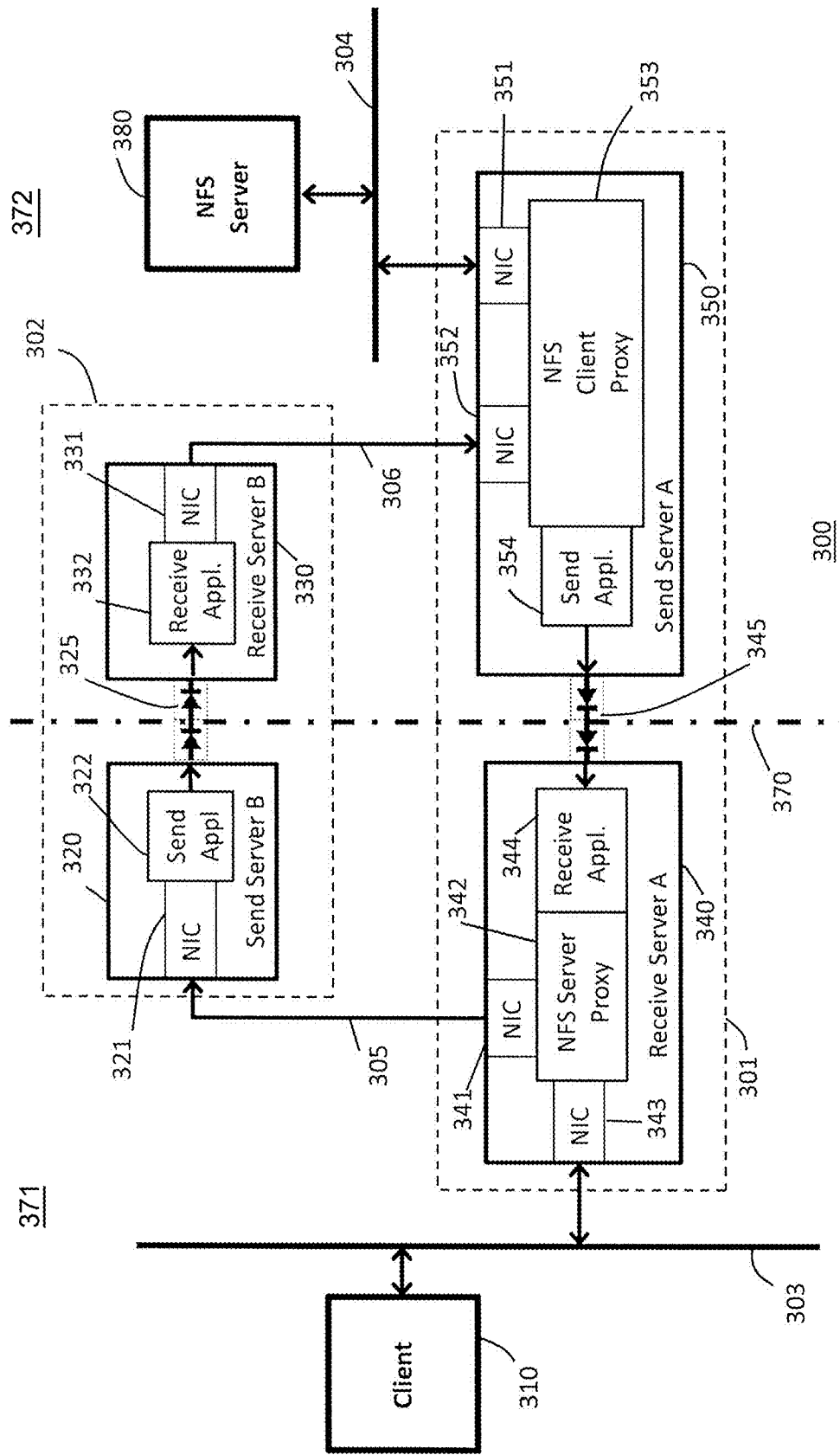
FIG. 3 is a functional block diagram of a first embodiment of the present invention.

Referring now to the drawings and in particular to FIG. 3, Cross Domain Solution (CDS) system 300 provides a seamless NFS proxy service across a pair of transfer platforms 301, 302. In particular, a client 310 in a first security domain (i.e., the area 371 on the left side of dotted line 370—the "left-side security domain") is able to access a NFS server 380 in a second security domain (i.e., the area 372 to the right of dotted line 370—the "right-side security domain") using CDS system 300. Platform 301 includes a send server 350 (Send Server A), a one-way data link 345 and a receive server 340 (Receive Server A). Likewise, platform 302 includes a send server 320 (Send Server B), a one-way data link 325 and a receive server 330 (Receive Server B). Each one-way data link 325, 345 may be, for example, a set of Owl one-way DualDiode Communication Cards coupled via an optical fiber. CDS system 300 enables integrated dual data paths in a single CDS instance. Users of client 310 are able to perform normal NFS mount operations and access files from that mount point.

Client 310 is coupled to a first network 303 in the first security domain 371. Receive server 340 is also coupled to the first network 303 (via network interface controller 343). Receive server 340 is coupled to send server 320 via a first dedicated data path (link) 305 (also in the first security domain 371) and associated network interface controllers 341, 321 (data communications interfaces). Send server 350 is coupled to receive server 330 via a second data path (link) 306 (in the second security domain 372) and associated network interface controllers 352, 331 (data communications interfaces). The two data paths 305, 306 may each be, preferably, a single Ethernet cable (i.e., a dedicated network connection). However, as one of ordinary skill in the art will readily recognize, other types of data paths may be used, e.g., a single point to point connection. When point to point connections are used, the associated network interface controllers 321, 341, 331, 352 are replaced by the appropriate controller for the type of point to point connection to be used. For example, when data paths 305 and 306 constitute a USB line, respective USB controllers replace each of the network interface controllers. Send server 350 is coupled to a second network 304 in the second security domain 372 via a network interface controller 351. NFS server 380 is also coupled to the second network 304.

Each send server 320, 350 includes an associated send application 322, 354 which receives packets and forwards them to the respective associated one-way data link 325, 345. The send applications 322, 354 can each act as a multiplexer, combining information from separate sources for transmission across the one-way data link. Each receive server 330, 340 includes an associated receive application 332, 344 which receives packets from the respective associated one-way data link 325, 345. Receive application 332 forwards packets to network interface controller 331, while receive application 344 forwards packets to NFS server proxy 342, discussed in detail below. The receive applications 332, 344 can each act as a demultiplexer, separating the combined information for transmission to different preconfigured destinations.

NFS server proxy 342 enables the transfer of requests between client 310 and NFS server 380. Although only a single client 310 and single NFS server 380 are shown in FIG. 3, as one of ordinary skill in the art will readily recognize, more than one client-server pair can be configured. For example, in a presently preferred embodiment, up to eight NFS client-server pairs may be configured. Client 310 accesses the NFS server proxy 342 based on a preconfigured IP address for network interface controller 343. Similarly, the NFS client proxy 353 access to the NFS server is based on a mapping of the IP address of the NFS server 380 in the NFS client proxy 353. Although only a single NFS server 380 is shown, in the presently preferred embodiment, up to eight IP addresses can be configured for mapping to eight separate NFS servers. Additionally, there may be multiple server proxies for each IP address so that multiple clients may be served at the same time. In the presently preferred embodiment, up to eight servers may be configured for each IP address.

Transfer platform 301 maintains the NFS source and destination proxies. The NFS server proxy 342 runs on receive server 340. The NFS client proxy 353 runs on the send server 350. Receive server 340 and send server 350 comprise the secure NFS response path.

Transfer platform 302 provides the secure request path. Send server 320 receives NFS query/requests (via link 305) from NFS server proxy 342 as packets. Send application 322 forwards the received query/request to one-way link 325. Receive application 332 in receive server 330 receives the query/request and forwards it to NFS client proxy 353 on send server 350 (via link 306). The NFS client proxy 353, in turn, transfers the query/request to NFS server 380, as discussed below.

In operation, platform 302 provides the path over which RPC function calls are made from client 310 to NFS server 380, while platform 301 provides the path over which the RPC functions return values are transferred from NFS server 380 to client 310. Because RPC function calls are usually shorter than responses, the communication path carrying them consisting of network interface controller 341, link 305, network interface controller 321, one-way link 325, network interface controller 331, link 306, and network interface controller 352, may be implemented by lower bandwidth components as compared to the path carrying the return values consisting of network interface controller 351, one-way link 345, and network interface controller 343.

Two processes are the key part of CDS system 300: (1) the NFS server proxy process 342 and (2) the NFS client proxy process 353. NFS server proxy 342 is configured to act like an NFS server in the first security domain 371, while NFS client proxy 353 is configured to act like an NFS client in the second security domain 372. NFS server proxy 342 and NFS client proxy 353 are processes that are distinct from the associated send and receive applications 354, 344, and can be considered as a pair of processes that are connected over a pair (at each end) of sockets. In overview, each NFS server proxy process 342 (there may be up to eight separate processes 342 running at once in the presently preferred embodiment per IP address) acts as a single NFS server and accepts requests from client 310, while each NFS client proxy process 353 (one for each of the running NFS server proxy processes) acts as an NFS client and makes requests to a single NFS server 380.

Figure 4:
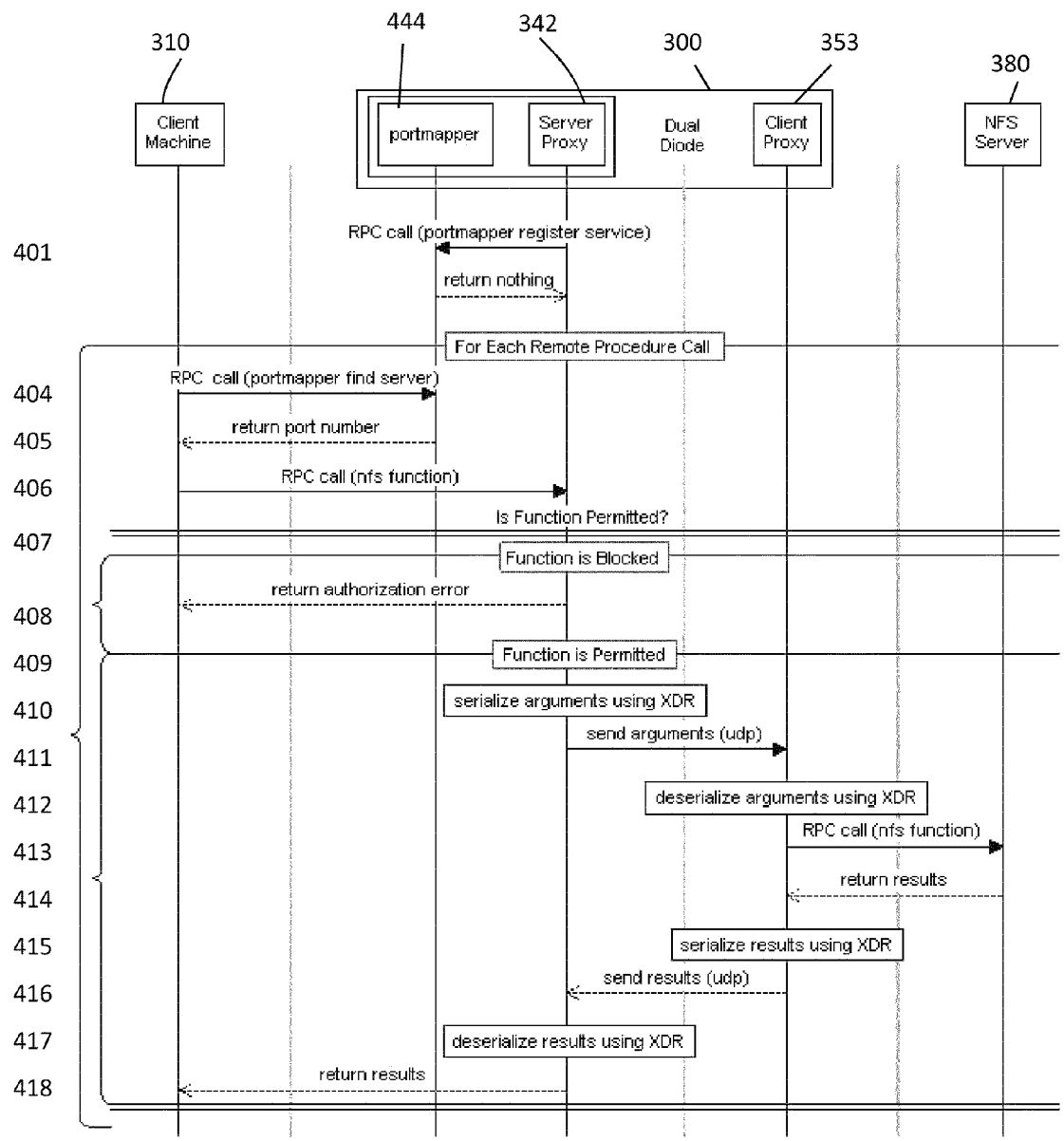
FIG. 4 is a flow diagram demonstrating how CDS system 300 operates.

Referring now to FIG. 4, in operation, NFS server proxy process 342 (each process operates identically) operates in conjunction with a portmapper process 444 (shown in FIG. 4). At startup, NFS server proxy 342 registers itself with portmapper 444 (step 401) and then waits for a Remote Procedure Call (RPC) from client 310. To initiate an RPC function call, client 310 first issues an RPC to the portmapper process 444 requesting the port for the NFS server (step 404), the portmapper 444 responds with the port number (step 405). Client 310 then issues an RPC call for the desired NFS function (step 406). NFS server proxy 342 (step 407) examines the received NFS function to determine if it is a permitted function. For example, in the preferred embodiment, client 310 is provided with only read access, and any NFS write function is not allowed (in particular, any NFS command having write access or write permission). If the requested NFS function is not allowed (e.g., a write is requested), the function is blocked (step 407) and an authorization error is returned to client 310 (step 408). All NFS functions are predefined as either allowed or not allowed, but in the event that an NFS function is received which is not predefined, it is also blocked. If the function is permitted (step 409), the arguments are filtered (not shown in FIG. 4, discussed below), serialized according to the eXternal Data Representation (XDR) standard (step 410) and then forwarded to the corresponding NFS client proxy process 353 (step 411) via platform 302 (as shown in FIG. 3). NFS client proxy 353 deserializes the arguments based on XDR standard (step 412) and then simulates an RPC call (using the received arguments) to NFS server 380 (step 413). NFS client proxy 353 then waits for a corresponding response from NFS server 380 (step 414). The received response may be filtered, if desired, and then serialized using the XDR standard (step 415) and forwarded to NFS server proxy 342 (step 416). NFS server proxy 342 deserializes the arguments based on XDR standard (step 417), and then forwards an appropriate response back to client 310 based on the received response (step 418). Notably, NFS server proxy 342 and NFS client proxy 353 are each configured to strictly maintain data passing in one direction (e.g., from client 310 to server 380) completely separate from data passing in the opposite direction (e.g., from server 380 to client 310).

Under the default RPC security mechanism, every NFS request, including mount requests, contains a set of user credentials with a user identification number (UID) and group identification number (GID) to which the user belongs. NFS credentials are the same as those used for accessing local files, i.e., if a user belong to five groups, the user's NFS credentials contain the UID and five GIDs. On a typical NFS server, these credentials may be used to perform the permission checks that are part of a UNIX file access, e.g., to verify write permission to remove or alter a file or to execute permission to search directories. However, in the present embodiment of CDS system 300 (FIG. 3), the user is at client 310 located in a first security domain and the NFS server 380 is located in a second security domain, different from the first security domain. In this situation, it is often desirable to prevent anyone present in the second security domain from knowing who is accessing the files at NFS server 380. For example, when the first security domain is a top secret domain and the second security domain is lower level domain, e.g., secret, it may be desirable to prevent any identification information from passing from the top secret domain into the secret domain. This is done in CDS system 300 by filtering out, at NFS server proxy 342, all credential information passed as part of an RPC sent from client 310 (and intended for NFS server 380). The credential information may be deleted (if allowed under the particular NFS protocol), generalized (so that a single set of non-specific credentials are used for accessing NFS server 380) or spoofed (so that NFS server 380 believes that a local user within the same security domain is accessing the files). This is an important advantage over prior art CDS systems, which do not address the matter of verifying credentials to confirm the request is made with appropriate permissions, but then manipulating the credentials to hide the identity of the requester.

NFS server proxy 342 may be configured to filter other information, in addition to credential information, included within an allowed NFS function call, if necessary. For example, information about the physical or logical origin of the request may also be filtered.

NFS client proxy 353 may be configured to filter some or all of the information provided in response to the most recent NFS function call. For example, information about the origin of information (e.g., satellite ID) or labels, time stamps and map coordinates contained therein may be filtered by NFS client proxy 353.

Referring back to FIG. 3, the use of two separate platforms 301, 302 for receiving and transmitting information between the left-side security domain 371 and the right-side security domain 372 provides isolation between such information. In particular, by placing the NFS server proxy 342 in receive server 340, it is ensured that only filtered information is provided to send server 320 (i.e., via link 305) and that information that should not be provided from the left-side security domain 371 to the right side security domain 372 (e.g., credential information for a user at client 310) is never present within send server 320. Since such information is never present in send server 320, such information will never be passed across the boundary into the right-side security domain.

Figure 5:
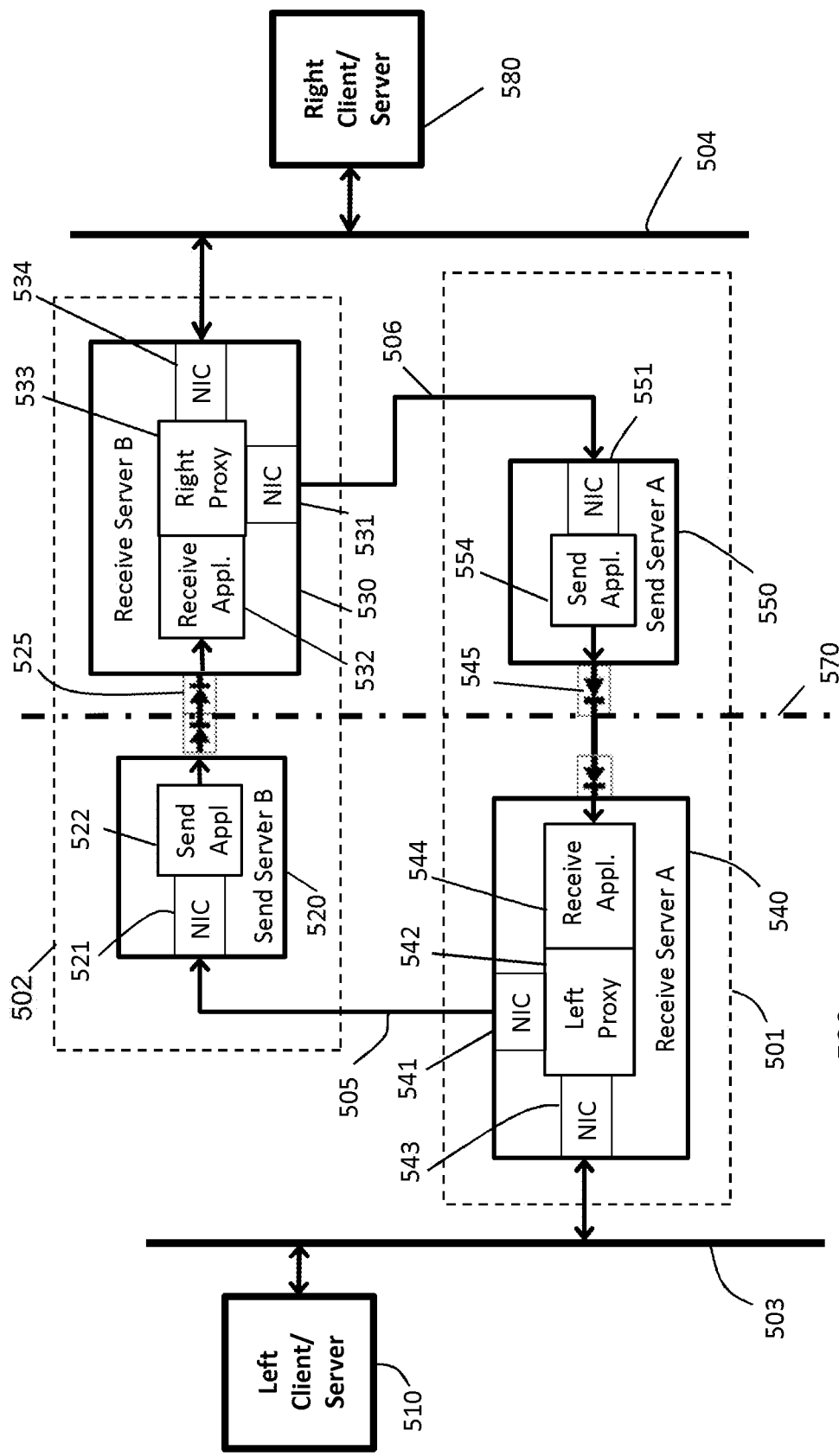
FIG. 5 is a functional block diagram of a second embodiment of the present invention.

Referring now to FIG. 5, an alternative embodiment is shown of a Cross Domain Solution system which isolates information passing from the left-side security domain to the right-side security domain and information passing from the right-side security domain to the left-side security domain. In the embodiment shown in FIG. 3, although information passing from the left to right security domains is filtered before being provided to send server 320, information passing from the right to left security domains is filtered after being provided to send server 350. In some circumstances, this could lead to a security breach, e.g., if transfer platform 301 is physically compromised and an attacker has access to the information on send server 350 and receive server 340, in particular information used for routing of messages by NFS server proxy 342 and NFS client proxy 353, as the filtering is performed by the same server performing the transfer across the one-way link 345. To overcome this problem, the proxy in the right-hand security domain (the area to the right of dotted line 570), i.e., right proxy 533, is moved to receive server 530 in the upper platform 502 in FIG. 5 (NFS client proxy 353 is in the lower platform 301 in FIG. 3).

In particular, CDS system 500 allows communication between a left client/server 510 coupled to a first network 503 in the left-side security domain and a right client/server 580 coupled to a second network 504 in the right-side security domain where communications may be initiated by the left client/server 510 (acting as a client) and responses come from the right client/server 580 (acting as a server); or communications may be initiated by the right client/server 580 (acting as a client) and responses come from the left client/server 510 (acting as a server). CDS system 500 includes two sets of transmission platforms 501, 502.

Transfer platform 501 provides for transmission of information only from the right-side security domain to the left-side security domain and includes receive server 540 (Receive Server A), send server 550 (Send Server A) and one-way data link 545. Receive server 540 is coupled to first network 503 via network interface controller 543. Separately, receive server 540 is coupled to send server 520 via network interface controller 541 (data communications interface), a first data path (link) 505, and network interface controller 521 (data communications interface). Finally, receive server 540 is coupled to send server 550 via one-way link 545. Send server 550 is coupled to receive server 530 via network interface card 551 (data communications interface), a second data path (link) 506 and network interface card 531 (data communications interface). The two data paths 505, 506 may each be, preferably, a single Ethernet cable (i.e., a dedicated network connection). However, as one of ordinary skill in the art will readily recognize, other types of data paths may be used, e.g., a single point to point connection. When point to point connections are used, the associated network interface controllers 521, 541, 534, 551 are replaced by the appropriate controller for the type of point to point connection to be used. For example, when data paths 505 and 506 constitute a USB line, respective USB controllers replace each of the network interface controllers. A send application 554 running on send server 550 receives information via the network interface card 551 and sends it via one-way data link 545 to receive application 544 running on receive server 540. Receive application 544 forwards received information to left proxy 542 for further processing as discussed below.

Transfer platform 502 provides for transmission of information only from the left-side security domain to the right-side security domain and includes receive server 530 (Receive Server B), send server 520 (Send Server B) and one-way data link 525. Receive server 530 is coupled to second network 504 via network interface controller 534. Separately, receive server 530 is coupled to send server 550 via network interface controller 531, second dedicated network connection 506, and network interface controller 551. Finally, receive server 530 is coupled to send server 520 via one-way link 525. Send server 520 is coupled to receive server 540 via network interface card 521, first dedicated network connection 505 and network interface card 541. A send application 522 running on send server 520 receives information via the network interface card 521 and sends it via one-way data link 525 to receive application 532 running on receive server 530. Receive application 532 forwards received information to right proxy 533 for further processing as discussed below.

Figure 1:
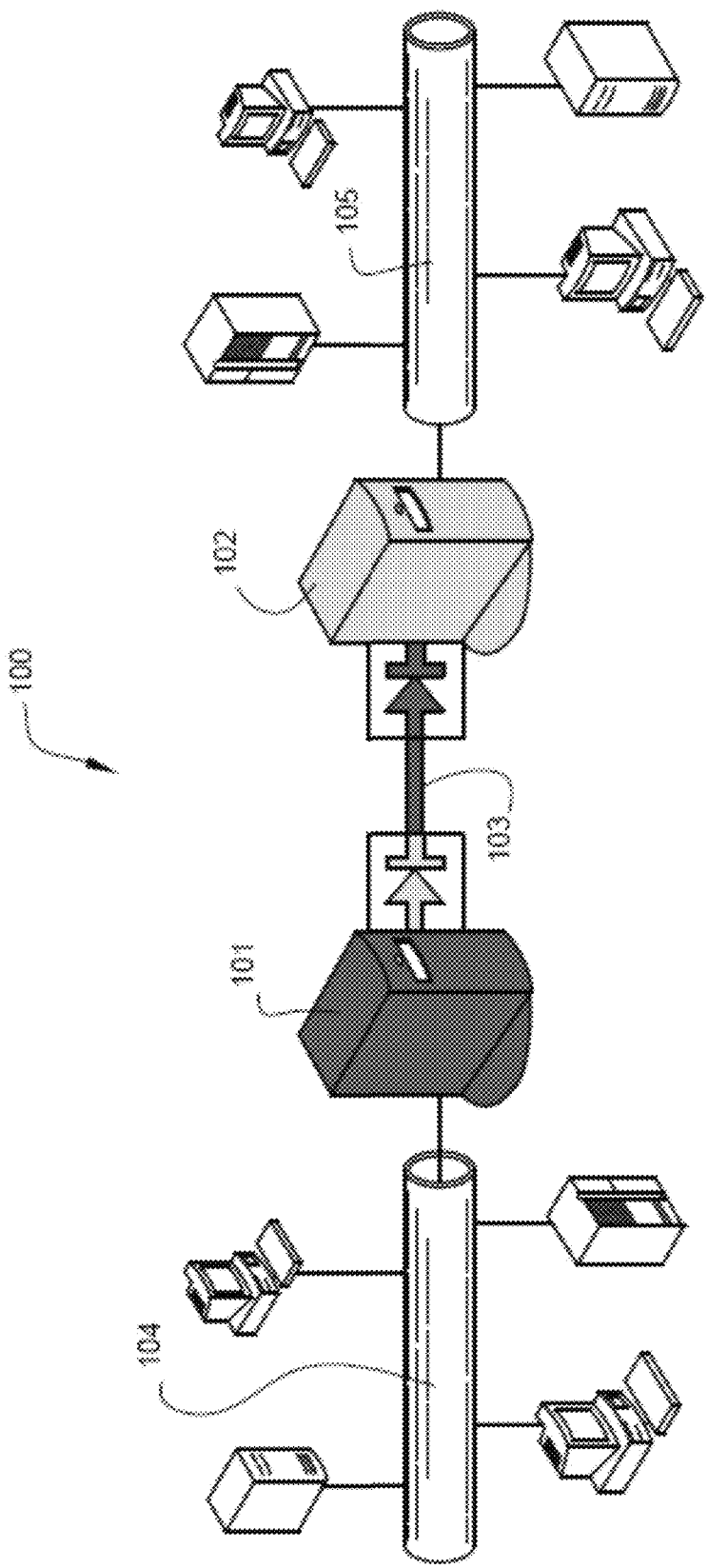
FIG. 1 schematically illustrates an example of a secure one-way data transfer system based on a one-way data link.
Figure 2:
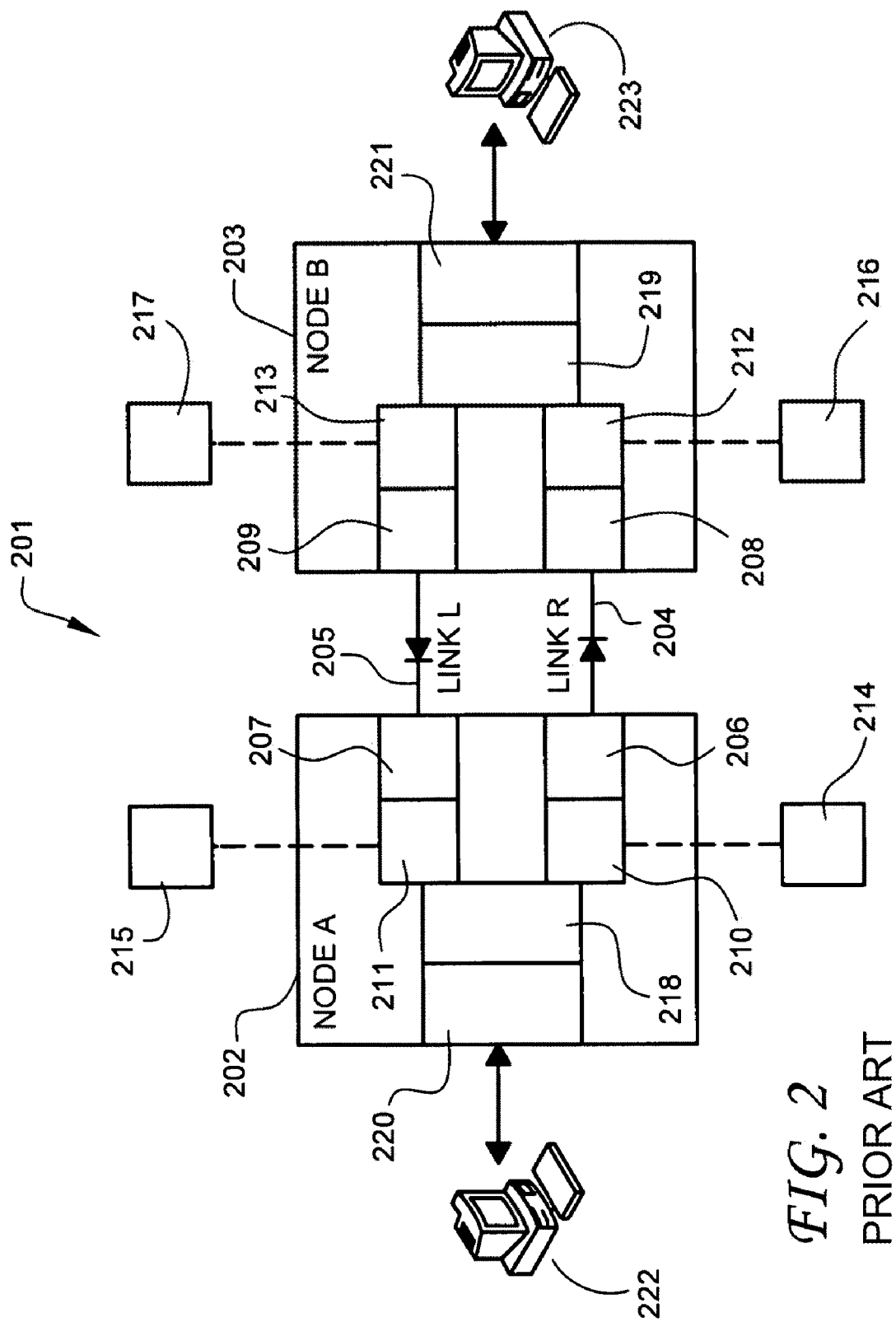
FIG. 2 is a functional block diagram of an example of a system for bilateral communication using two one-way data links.

Right proxy 533 and left proxy 542 operate in similar ways. Left proxy 542 receives information from left client/server 510 via network 503, processes the information if necessary, and forwards the information (which may be processed) to send server 520. As discussed above with respect to NFS server proxy 342, some received information may be blocked during processing, such as an NFS write command. In addition, the processing may involve filtering, either on message content or on associated information (e.g., credentials) sent with the message content. Send application 522 in send server 520 receives the information and forwards it across one-way link 525 to receive application 532 in receive server 530. Receive application 532 transfers the received information to right proxy 533, which in turn forwards the information to right client/server 580 via network 504. The transmission of the information from send application 522 to right client/server 580 operates in a manner identical to that of the system shown in FIG. 2 (as described above and in greater detail in the '209 Patent).

The operation of right proxy 533 mirrors that of left proxy 542. Right proxy 533 receives information from right client/server 580 via network 504, processes the information if necessary, and forwards the information (which may be processed) to send server 550. As discussed above, some received information may be blocked during processing, such as an NFS write command. In addition, the processing may involve filtering, either on message content or on associated information (e.g., credentials) sent with the message content. Send application 554 in send server 550 receives the information and forwards it across one-way link 545 to receive application 544 in receive server 540. Receive application 544 transfers the received information to left proxy 542, which in turn forwards the information to left client/server 510 via network 503. The transmission of the information from send application 554 to left client/server 510 operates in a manner identical to that of the system shown in FIG. 2 (as described above and in greater detail in the '209 Patent).

In an embodiment of system 500, left proxy 542 may be an NFS server proxy and right proxy 533 may be an NFS client proxy, with the NFS client at left client/server 510 and the NFS server at right client/server 580. Because of its symmetrical structure, in a further embodiment of system 500, right proxy 533 may be an NFS server proxy and left proxy 542 may be an NFS client proxy, with the NFS client at right client/server 580 and the NFS server at left client/server 510.

System 500 provides an additional security level over the system shown in FIG. 3 because each send server 520, 550 only receives information to be transferred that has been already been processed (e.g., filtered or checked to be an authorized NFS command). This provides additional assurance that the desired processing is not bypassed, while maintaining separate one-way transmission paths. An additional advantage of system 500 is the physical placement of left proxy 542 and right proxy 533 in separate transfer platforms 501 and 502, respectively. This separation mitigates security risks since now an attacker would have to gain access to both transfer platforms to access information about the end-to-end routing of messages between the right-side security domain and the left-side security domain across dotted line 570 in FIG. 5.

While this invention has been described in conjunction with exemplary embodiments outlined above and illustrated in the drawings, it is evident that many alternatives, modifications and variations will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. A secure system for bilaterally transferring information between a client coupled to a first network and a server coupled to a second network, comprising:

a first platform comprising a first send server having a data communications interface, a first one-way data link having an input and an output, and a first receive server having a data communications interface, the first send server coupled to the input of the first one-way data link and the first receive server coupled to the output of the first one-way data link, the first send server configured to forward information received at the data communications interface to the input of the first one-way data link, the first receive server configured to forward information received from the output of the first one-way data link to the data communications interface;

a second platform comprising a second send server having a network connection and a data communications interface, a second one-way data link having an input and an output, and a second receive server having a network connection and a data communications interface, the second send server coupled to the input of the second one-way data link and the second receive server coupled to the output of the second one-way data link, the second receive server coupled to the first network via the network connection, the data communications interface of the second receive server coupled only to the data communications interface of the first send server, the second send server coupled to the second network via the network connection and the data communications interface of the second send server coupled only to the data communications interface of the first receive server;

wherein the second receive server is configured to receive first information from the client via the first network and the network connection, to process the received first information and to forward the processed first information to the first send server via the data communications interface;

wherein the second send server is configured to receive the processed first information via the data communications interface and to forward the processed first information to the server via the network connection and second network;

wherein the second send server is also configured to receive second information from the server via the second network and the network connection and to forward the second information to the second receive server via the second one-way data link;

wherein the second receive server is also configured to receive the second information from the second one-way data link and to forward the second information to the client via the network connection and first network; and wherein the first information comprises an NFS function call of a set of possible NFS function calls and wherein the processing performed by the second receive server comprises identifying a type of the NFS function call and blocking further transmission of the NFS function call if the identified type does not correspond to any one of a predetermined subset of possible NFS function calls.

2. The system of claim 1, wherein the second receive server and the second send server are each also configured to maintain the first information and the processed first information completely separate from the second information.

3. The system of claim 1, wherein the processing performed by the second receive server comprises filtering the first information to remove a predetermined category of information.

4. The system of claim 3, wherein the predetermined category of information comprises identification information.

5. The system of claim 4, wherein the identification information comprises user credentials.

6. The system of claim 1, wherein the predetermined subset of possible NFS function calls comprises all NFS commands except for NFS write commands.

7. The system of claim 1, wherein the predetermined subset of possible NFS function calls comprises all NFS commands except for NFS commands having write permission.

8. The system of claim 1, wherein the second receive server is configured to operate as an NFS server proxy.

9. The system of claim 1, wherein the second send server is configured to operate as an NFS client proxy.

10. The system of claim 1, wherein the second send server is further configured to filter the second information prior to forwarding the information to the second receive server via the second one-way data link.

11. A secure system for bilaterally transferring information between a client coupled to a first network and a server coupled to a second network, comprising:
a first platform comprising a first send server having a data communications interface, a first one-way data link having an input and an output, and a first receive server having a network connection and a data communications interface, the first send server coupled to the input of the first one-way data link and the first receive server coupled to the output of the first one-way data link, the first send server configured to forward information received at the data communications interface to the input of the first one-way data link, the network connection of the first receive server coupled to the second network;
a second platform comprising a second send server having a data communications interface coupled only to the data communications interface of the first receive server, a second one-way data link having an input and an output, and a second receive server having a data communications interface and a network connection, the second send server coupled to the input of the second one-way data link and the second receive server coupled to the output of the second one-way data link, the second send server configured to forward information received at data communications interface to the input of the second one-way data link, the network connection of the second receive server coupled to the first network and the data communications interface of the second receive server coupled only to the data communications interface of the first send server,
wherein the second receive server is configured to receive first information from the client via the first network and the network connection, to process the received first information and to forward the processed first information to the first send server via the data communications interface of the second receive server;
wherein the first receive server is configured to receive the processed first information via the first one-way data link and to forward the processed first information to the server via the network connection and second network;
wherein the first receive server is also configured to receive second information from the server via the second network and the network connection and to forward the second information to the second send server via the data communications interface;
wherein the second receive server is also configured to receive the second information from the second one-way data link and to forward the second information to the client via the network connection and first network; and
wherein the first information comprises an NFS function call of a set of possible NFS function calls and wherein the processing performed by the second receive server comprises identifying a type of the NFS function call and blocking further transmission of the NFS function call if the identified type does not correspond to any one of a predetermined subset of possible NFS function calls.

12. The system of claim 11, wherein the second receive server and the first receive server are each also configured to maintain the first information and the processed first information completely separate from the second information.

13. The system of claim 11, wherein the processing performed by the second receive server comprises filtering the first information to remove a predetermined category of information.

14. The system of claim 13, wherein the predetermined category of information comprises identification information.

15. The system of claim 14, wherein the identification information comprises user credentials.

16. The system of claim 11, wherein the predetermined subset of possible NFS function calls comprises all NFS commands except for NFS write commands.

17. The system of claim 11, wherein the predetermined subset of possible NFS function calls comprises all NFS commands except for NFS commands having write permission.

18. The system of claim 11, wherein the second receive server is configured to operate as an NFS server proxy.

19. The system of claim 11, wherein the first receive server is configured to operate as an NFS client proxy.

20. The system of claim 11, wherein the first receive server is further configured to filter the second information prior to forwarding the information to the second send server via the network connection.

21. A secure system for bilaterally transferring information between a client coupled to a first network and a server coupled to a second network, comprising:
a first platform comprising a first send server having a data communications interface, a first one-way data link having an input and an output, and a first receive server having a data communications interface, the first send server coupled to the input of the first one-way data link and the first receive server coupled to the output of the first one-way data link, the first send server configured to forward information received at the data communications interface to the input of the first one-way data link, the first receive server configured to forward information received from the output of the first one-way data link to the data communications interface;

a second platform comprising a second send server having a network connection and a data communications interface, a second one-way data link having an input and an output, and a second receive server having at least two network connections, the second send server coupled to the input of the second one-way data link and the second receive server coupled to the output of the second one-way data link, the second receive server coupled to the first network via the network connection, the data communications interface of the second receive server coupled only to the data communications interface of the first send server, the second send server coupled to the second network via the network connection, the data communications interface of the second send server coupled only to the data communications interface of the first receive server;

wherein the second receive server is configured to receive first information from the client via the first network and the network connection and to forward the first information to the first send server via the data communications interface;

wherein the second send server is configured to receive the first information via the data communications interface and to forward the first information to the server via the network connection and second network;

wherein the second send server is also configured to receive second information from the server via the second network and the network connection, to process the received second information and to forward the processed second information to the second receive server via the second one-way data link;

wherein the second receive server is also configured to receive the processed second information from the second one-way data link and to forward the processed second information to the client via the network connection and first network; and wherein the first information comprises an NFS function call of a set of possible NFS function calls.

22. The system of claim 21, wherein the second receive server and the second send server are each also configured to maintain the first information completely separate from the second information and the processed second information.

23. The system of claim 21, wherein the processing performed by the second receive server comprises filtering the second information to remove a predetermined category of information.

24. The system of claim 23, wherein the predetermined category of information comprises identification information.

25. The system of claim 24, wherein the identification information comprises user credentials.

26. The system of claim 21, wherein the second receive server is configured to operate as an NFS server proxy.

27. The system of claim 21, wherein the second send server is configured to operate as an NFS client proxy.

28. A secure system for bilaterally transferring information between a client coupled to a first network and a server coupled to a second network, comprising:

a first platform comprising a first send server having a data communications interface, a first one-way data link having an input and an output, and a first receive server having a network connection and a data communications interface, the first send server coupled to the input of the first one-way data link and the first receive server coupled to the output of the first one-way data link, the first send server configured to forward information received at the data communications interface to the input of the first one-way data link, the network connection of the first receive server coupled to the second network;

a second platform comprising a second send server having a data communications interface coupled only to the data communications interface of the first receive server, a second one-way data link having an input and an output, and a second receive server having a data communications interface and a network connections, the second send server coupled to the input of the second one-way data link and the second receive server coupled to the output of the second one-way data link, the second send server configured to forward information received at the data communications interface to the input of the second one-way data link, the network connection of the second receive server coupled to the first network and the data communications interface of the second receive server coupled only to the data communications interface of the first send server, wherein the second receive server is configured to receive first information from the client via the first network and the network connection and to forward the first information to the first send server via the data communications interface of the second receive server;

wherein the first receive server is configured to receive the first information via the first one-way data link and to forward the first information to the server via the network connection and second network;

wherein the first receive server is also configured to receive second information from the server via the second network and the network connection, to process the received second information and to forward the processed second information to the second send server via the data communications interface;

wherein the second receive server is also configured to receive the processed second information from the second one-way data link and to forward the processed second information to the client via the network connection and first network; and wherein the first information comprises an NFS function call of a set of possible NFS function calls.

29. The system of claim 28, wherein the second receive server and the first receive server are each also configured to maintain the first information completely separate from the second information and the processed second information.

30. The system of claim 28, wherein the processing performed by the second receive server comprises filtering the information to remove a predetermined category of information.

31. The system of claim 30, wherein the predetermined category of information comprises identification information.

32. The system of claim 31, wherein the identification information comprises user credentials.

33. The system of claim 28, wherein the second receive server is configured to operate as an NFS server proxy.

34. The system of claim 28, wherein the first receive server is configured to operate as an NFS client proxy.

35. The system of claim 28, wherein the second receive server is further configured to filter the first information prior to forwarding the first information to the second send server via the network connection.

* * * * *